United States Patent [19]

Inukai et al.

[11] 4,106,722
[45] Aug. 15, 1978

[54] DEVICE FOR PREVENTING EXCESSIVE TIGHTNESS OF SEATBELTS

[75] Inventors: Mitsuo Inukai, Nagoya; Yoshihiro Hayashi, Kasugai, both of Japan

[73] Assignee: K. K. Tokai Rika Denki Seisakusho, Japan

[21] Appl. No.: 780,832

[22] Filed: Mar. 24, 1977

Related U.S. Application Data

[63] Continuation-in-part of Ser. No. 762,574, Jan. 26, 1977, abandoned.

[30] Foreign Application Priority Data

Mar. 26, 1976 [JP] Japan .................................. 51-37045

[51] Int. Cl.² ........................ A62B 35/02; B65H 75/48
[52] U.S. Cl. .................................................. 242/107.7
[58] Field of Search ... 242/107.7, 107.6, 107.4 R–107.4 E, 242/107.12; 280/744–747; 297/388

[56] References Cited

U.S. PATENT DOCUMENTS

| | | | |
|---|---|---|---|
| 2,698,146 | 12/1954 | Becker | 242/107.7 |
| 3,384,108 | 5/1968 | Kern | 242/107.7 X |
| 3,490,715 | 1/1970 | Nicpon | 242/107.7 |
| 3,491,966 | 1/1970 | Curran et al. | 242/107.6 X |
| 3,834,646 | 9/1974 | Heath | 242/107.7 |
| 3,851,836 | 12/1974 | Sprecher | 242/107.7 |
| 4,002,311 | 1/1977 | Fisher et al. | 242/107.7 |

Primary Examiner—Harvey C. Hornsby
Assistant Examiner—John M. Jillions
Attorney, Agent, or Firm—Koda and Androlia

[57] ABSTRACT

A seatbelt retractor including a means for preventing excessive tightness of the seatbelt during use. The seatbelt retractor including a frame, a seatbelt take-up spool having a torque applied thereto in a wind-up direction and rotatably coupled to the frame, at least one ratchet gear coupled to the take-up spool, a pawl pivotally coupled to the frame and engageable with the pawl gear such that the spool is prevented from winding up when the pawl engages with the ratchet gear, and a means for disengaging the pawl from the ratchet gear when the seatbelt is completely wound on the spool or so long as the seatbelt is being pulled out from the wound up state and for engaging the pawl with the ratchet gear when the seatbelt is being utilized.

4 Claims, 6 Drawing Figures

DEVICE FOR PREVENTING EXCESSIVE TIGHTNESS OF SEATBELTS

This is a continuation-in-part of U.S. patent application Ser. No. 762,574, now abandoned.

BACKGROUND OF THE INVENTION

1. Field of Invention

This invention relates to safety devices used in motor vehicles and the like and more particularly to seatbelt retractors.

2. Prior Art

With the advent of an awareness of vehicle safety and government regulation, a number of safety devices such as seatbelts have been provided in vehicles and particularly in automobiles. A typical prior art seatbelt for the use in an automobile and the like is fastened at one end to a take-up spool having a torque in the wind-up direction of the belt applied to it. When the wearer places the seatbelt about his body, the wearer usually pulls out some extra length of seatbelt and after the buckle is coupled to the tongue plate, the excess seatbelt is automatically wound up by the aforementioned torque. Immediately thereafter, the wearer consciously or unconsciously adjusts the tension of the seatbelt by certain motions of his body such as, for example, bending the body slightly forward, or tensing the stomach muscles thus pulling the belt out a little. However, because the torque action on the take up spool tends to pull the belt in such that the tension gradually increases, an increased amount of discomfort is caused to the wearer. As a result of this discomfort, the wearer tends to discontinue use of the seatbelt and develop an aversion to wearing same. Such an aversion to the use of seatbelts is likely to increase the chance of injury to the non-wearer in an accident.

Accordingly, the present invention attempts to solve the shortcomings of the prior art discussed hereinabove.

SUMMARY OF THE INVENTION

It is the general object of the present invention to provide a mechanism for a seatbelt retractor which prevents the seatbelt from being pulled too tight on the wearer.

It is another object of the present invention to provide a mechanism for a seatbelt retractor which is simple and low in cost.

In keeping with the principles of the present invention, the objects are accomplished by a unique mechanism for a seatbelt retractor for preventing excessive tightness of the seatbelt during use including a retractor frame, a seatbelt take-up spool rotatably coupled to the frame and having a torque applied thereto in a windup direction, a seatbelt wound on the spool, at least one ratchet gear coupled to one end of the take-up spool, a pawl pivotally coupled to the frame and engageable with the ratchet gear such that the spool is prevented from winding up when the pawl engages with the ratchet gear and a means for disengaging the pawl from the ratchet gear when the seatbelt is completely wound on the spool, so long as the seatbelt is being pulled out from the wound up state or the seatbelt is being wound up and for engaging the pawl with the ratchet gear when the seatbelt is being utilized.

BRIEF DESCRIPTION OF THE DRAWINGS

The above mentioned features and other objects of the present invention will become more apparent by reference to the following description taken in conjunction with the accompanying drawings, wherein like reference numerals denote like elements, and in which:

FIG. 6 is a detailed view of a modification of the cam plate.

DETAILED DESCRIPTION OF THE INVENTION

Figure 1:
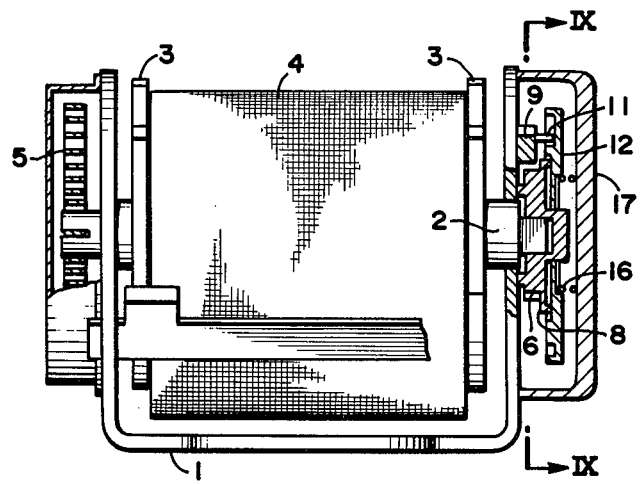
FIG. 1 is a partial plan view of the seatbelt retractor and mechanism for preventing excessive tightness in accordance with the teachings of the present invention.

Referring to FIG. 1, seatbelt retractor includes a U shaped retractor frame 1 having a take-up spool 2 rotatably coupled thereto. Adjacent the ends of spool 2 are provided spool frames 3 and one end of seatbelt 4 is secured to and wound around spool 2 between spool frames 3. Coil spring 5 is provided on the outside of retractor frame 1 and the inner end of spring 5 is coupled to take-up spool 2 and the outer end of spring 5 is coupled to retractor frame 1. Spring 5 is provided to provide the torque in the winding up direction of the seatbelt 4.

At the opposite end from the spring 5 and outside the retractor frame 1 is provided a ratchet gear 6 fixed to one end of take-up spool 2. Each tooth of ratchet gear 6 has an engaging surface 7 facing the counter clockwise direction or winding up direction of the seatbelt 4. A flange 8 projects laterally from the outside surface of ratchet gear 6. The pawl 9 is pivotally coupled to retractor frame 1 and provided adjacent ratchet gear 6 such that the end of pawl 9 can engage with engaging surface 7 of ratchet gear 6 thereby locking ratchet gear 6 and rendering the take-up spool 2 unrotatable in the wind up direction.

A pin 11 for controlling the movement of pawl 9, which will be discussed later hereinbelow, projects outwardly from pawl 9 at about the midway point in the length of ratchet 9. A cam plate 12 is fitted on to a hub on ratchet gear 6 and abuts against the outer surface of ratchet gear 6. Cam plate 12 frictionally engages with ratchet gear 6 and is pressed against ratchet gear 6 by the spring action of spring 16 which is provided between the inside surface of cam cover 17 and the outside surface of cam plate 12. As a result of the friction on engagement between cam plate 12 and ratchet gear 6, cam plate 12 rotates together with ratchet gear 6.

Figure 2:
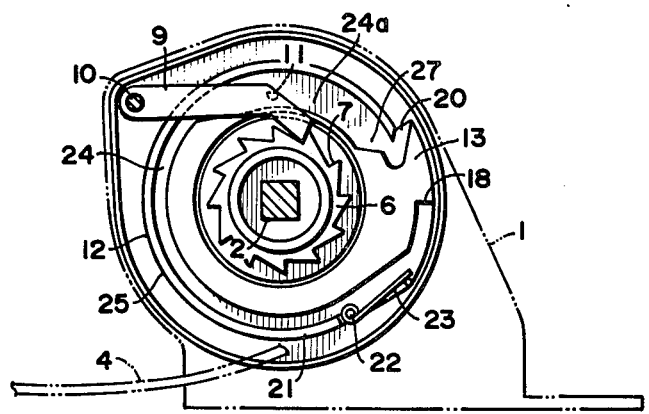
FIG. 2 is a cross-sectional view of the embodiment of FIG. 1 along the lines IX — IX of FIG. 1.

As shown in FIG. 2, on the inner surface of cam plate 12 at a location corresponding to pin 11 are provided a first cam guide 24, a circular second cam guide 25, and a third cam guide 27. The first cam guide 24 comprises a leading end 24a, a straight surface 24b which is located near the trailing end 24c of cam guide 24 and a trailing end 24c. In this embodiment, the leading end 24a of first cam guide 24 is approximately 80 degrees. Following the leading 24a is an incline surface 24' of the first cam guide 24 which carries the pin 11 in such a manner that the pawl 9 is disengaged from the engaging surfaces 7 of ratchet gear 6. It should be noted that the extent of the leading end 24a could be decreased to a smaller angle if so desired without departing from the spirit and scope of the invention. The leading end 24a of first cam guide 24 is inserted over pin 11 projecting from pawl 9 when pawl 9 is in engagement with surface 7 of a tooth of ratchet gear 6. As cam plate 12 rotates about an angle of 270° in the unwinding direction, first cam guide 24 causes pin 11 and pawl 9 to rotate away from the engaging surface 7 so as to cause pawl 9 to disengage from the surface 7. The circular second cam guide 25 is exterior to and coaxial with first cam guide 24. Furthermore, the trailing end of first cam guide 24 ends in a stopper 18 which is formed in the side of projecting part 26 and is opposite incline groove 20. Outer wall 21 separates the first cam guide 24 from the second cam guide 25 and a pivot pin 22 is formed at the end of the outer wall 21 adjacent the trailing end 24c of first cam guide 24 and a switching plate 23 is pivotally coupled at one end to the pivot pin 22. The other end of switching plate 23 is in contact with the straight surface 24b of first cam guide 24 and its freedom of movement can be limited either by a stop or by a spring (not shown). Incline groove 20 is formed at the trailing end of second cam guide 25. Furthermore, the leading end 24a of first cam guide 24 is connected to the incline groove 20 by a third cam guide 27.

The third cam guide 27 guides the pin 11 which is in the incline groove 20 into the leading end 24a of the first cam guide 24 when cam plate 12 rotates in the clockwise direction, thereby pawl 9 engages with engaging surface 7 of ratchet gear 6 again.

Figure 3:
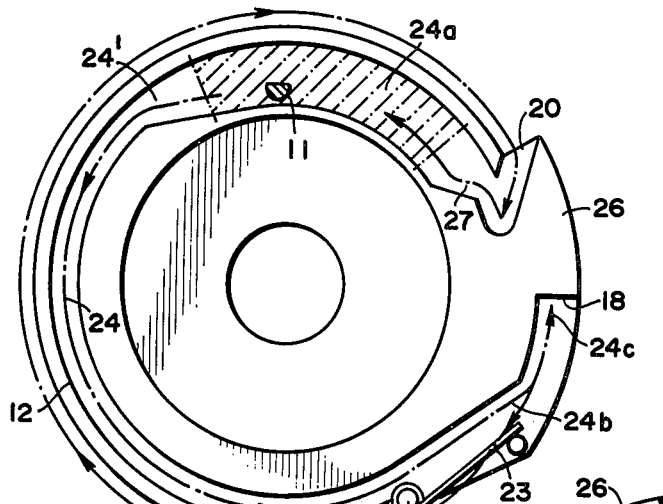
FIG. 3 is a view of the inside surface of the cam plate.
Figure 4:
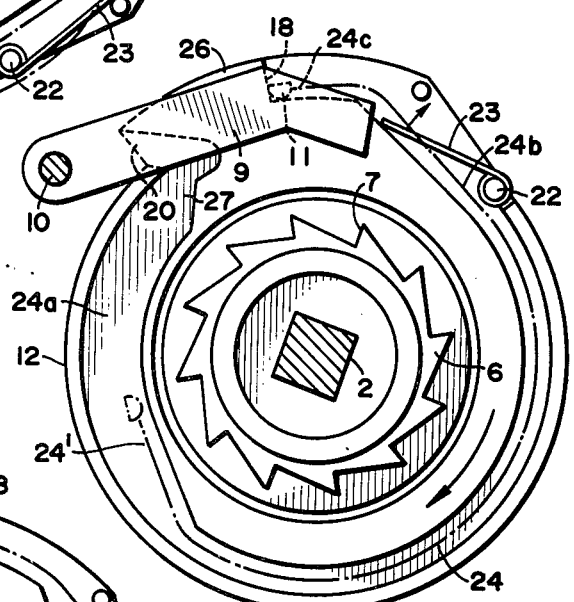
FIG. 4 and FIG. 5 are views of the inside surface of the cam plate and associated parts for the purpose of illustrating the operation of the mechanism.

In operation, when the seatbelt 4 which has been rolled up on the spool 2 is pulled out for use, the spool 2, the ratchet gear 6 and the cam plate 12 all rotate in the clockwise direction (with reference to FIG. 3). The pin 11 is carried from the leading end 24a of first cam guide 24 across the inclinded surface, thereby swinging the pawl 9 in such a direction that it disengages from the engaging surfaces 7 of the ratchet gear 6. The ratchet gear 6 is then free to rotate in the direction of belt retraction. Then, the pawl 9 is held in the same relative position until the cam plate 12 has rotated through approximately 180°, whereupon it is carried even further toward the perimeter of the cam plate 12 by the action of pin 11 being guided by the straight surface 24b of first cam guide 24. After the cam plate 12 is rotated through approximately 180°, the pin 11 encounters switching plate 23 and pushes it aside and advances into the trailing end 24c of first cam guide 24 and continues rotation until it encounters stopper 18. After pin 11 encounters stopper 18, the slippage occurs between cam plate 12 and ratchet gear 6 since the rotation of cam plate 12 is stopped by the stop 18 while the ratchet gear 6 continues to rotate in the clockwise direction. After pin 11 has passed by switching plate 23 by pushing it aside, switching plate 23 returns to its orignial state, engaged with flat surface 24b as shown in FIG. 4.

When the seatbelt is sufficiently pulled out and wrapped around the body of the user and the buckle and tongue are fastened together the belt 4 will be slightly loose.

The excess length is then rolled up for the rotational power applied to spool 2 by spring 5 and the belt 4 becomes tight. While the spool 2 is retracting the seatbelt 4, pin 11 moves in a clockwise direction relative to cam plate 12 and rides over the exterior surface of switching plate 23.

Figure 5:
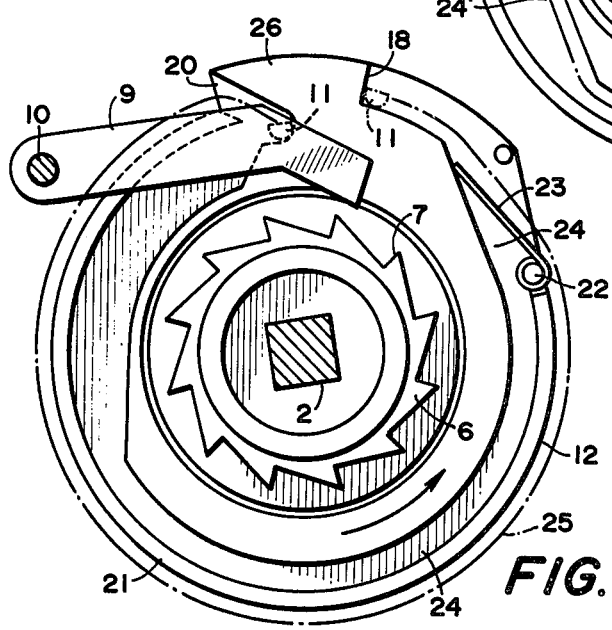

After the cam plate 12 has rotated approximately 330° in the counter-clockwise direction, the pin 11 enters the inclined groove 20 as seen in FIG. 5. At this point the cam plate 12 begins to slip while the spool 2 and ratchet gear 6 continue to turn, thereby allowing the belt to tighten up on the spool 2.

Afterwards, when the user tests the use of the belt by stretching his stomach muscles or leaning slightly forward, the spool 2 and the guide plate 12 both rotate slightly in the clockwise direction. The pin 11 is then carried from the inclined groove 20 which is connected to the trailing end of second cam guide 25 into the leading end 24a of first cam guide 24 through the third cam guide 27 as shown in FIGS. 2 and 3. This allows the pawl 9 to engage an appropriate engaging surface 7 on ratchet gear 6 thereby locking the spool 2 so that retraction of the seatbelt becomes impossible. Since under these conditions the spool 2 can only rotate in the direction of belt extension, there is no danger that the tightness of the seatbelt 4 will be increased.

FIG. 6 shows another embodiment of the cam plate. This cam plate is made of plastics or metal. According to this practice, it is designed that the trailing portion 21a of the outer wall 21 is adapted to serve the same function as the switching plate 23 in the preceding embodiment attains. More specifically, the first cam guide 24 is cut out at 28 of its grooved bottom in the vicinity of the straight surface 24b so that the trailing portion 21a can be flexible by its own elasticity radially outwardly as indicated by the arrow while the portion 21a being hold at the proximal end portion 21d by the cam plate 21. The extreme tip end 21c of the outer wall 21 is placed close to the straight surface 24b, and along with the straight surface 24b the end 21c forms a gap 29 therebetween whose size is selected smaller than the diameter of the pin 11.

In operation, when the pin 11 moves from the first cam guide 24 to the trailing end 24c, it spreads the extreme end 21c outwardly to pass through the gap 29. After the pin having cleared the gap, the end 21c restores its original position as shown by own elasticity, and the pin 11 strides over the gap 29 to move from the trailing end 24c to the second cam guide 25.

As described hereinabove, the retractor of the present invention comprises a take-up spool provided with a torque to rotate in the winding up direction, a ratchet gear having engaging surfaces facing the winding direction, a rotatable cam plate which frictionally engages the ratchet gear and a pawl for engaging an engaging surface of a tube for the ratchet gear thereby locking the take-up spool and rendering its rotation impossible. Accordingly, excessive tightness of the seatbelt after it has been placed on the wearer can be accurately prevented by an exceedingly simple mechanism. Moreover, no extra steps or actions are required on the part of the wearer other than merely buckling the seatbelt. Furthermore, it should be apparent to one skilled in the art that the abovedescribed seatbelt retractor mechanism would also include a means for preventing the extension of the seatbelt during an accident. Such a means would include inertia type locking mechanisms for seatbelt retractors. Furthermore, it should be apparent that the frictional force which cause cam plate 12 to rotate need not be between the cam plate 12 and the ratchet gear 6 but could be supplied in a number of ways such as between the cam plate 12 and the hub on the ratchet gear 6.

In all cases, it is understood that the above-described embodiment is merely illustrative of but a few of the many specific embodiments which represent the applications of the principles of the present invention. Furthermore, numerous and varied other arrangements can be readily devised in accordance with the principles of the present invention by those skilled in the art without departing from the spirit and scope of the invention.

I claim:

1. A seat belt retractor comprising:

a frame;

a seat belt takeup spool rotatably coupled to said frame;

a means for applying a rotational torque to said spool in a winding up direction;

a seat belt wound on said spool;

at least one ratchet gear coupled to said spool;

a pawl pivotally coupled to said frame and engageable with said ratchet gear such that the spool is prevented from winding up said seat belt when said pawl engages with said ratchet gear;

a cam plate frictionally coupled to said ratchet gear and rotatable therewith;

a first cam guide provided on said cam plate for guiding said pawl in such a direction that it disengages from said ratchet gear as said cam plate rotates in a direction of seat belt extension;

a second cam guide provided on said cam plate continuous with said first cam guide for holding said pawl in said disengaged position when said cam plate rotates in a winding up direction;

a third cam guide provided on said cam plate for engaging said pawl with said ratchet gear after said guide plate has rotated in a winding up direction and then rotates in an extending direction; and a switching means provided on said cam plate which automatically switches said pawl from said first cam guide to said second cam guide when the direction of rotation of said cam plate switches from the extending direction to the winding up direction.

2. A seatbelt retractor according to claim 1 wherein said pawl includes a projecting pin which cooperates with said first, second and third cam guides.

3. A seatbelt retractor according to claim 2 wherein said first, second and third cam guides comprise grooves on the inside surface of said cam plate.

4. A seatbelt retractor according to claim 3 wherein said means for applying a rotational torque comprises a coil spring.

* * * * *